(12) United States Patent
Kroos et al.

(10) Patent No.: US 9,255,559 B2
(45) Date of Patent: Feb. 9, 2016

(54) METALLIC HOLLOW VALVE

(71) Applicant: Mahle International GmbH, Stuttgart (DE)

(72) Inventors: Peter Kroos, Rutesheim (DE); Christoph Luven, Stuttgart (DE); Roland Schacherer, Geisingen (DE)

(73) Assignee: Mahle International GmbH (DE)

( * ) Notice: Subject to any disclaimer, the term of this patent is extended or adjusted under 35 U.S.C. 154(b) by 3 days.

(21) Appl. No.: 14/192,851

(22) Filed: Feb. 27, 2014

(65) Prior Publication Data

US 2014/0239218 A1    Aug. 28, 2014

(30) Foreign Application Priority Data

Feb. 28, 2013   (DE) .................. 10 2013 203 443

(51) Int. Cl.
*F02M 63/00* (2006.01)
*B60G 21/055* (2006.01)

(52) U.S. Cl.
CPC ....... *F02M 63/0031* (2013.01); *B60G 21/0555* (2013.01); *B60G 2202/42* (2013.01); *B60G 2202/442* (2013.01); *B60G 2204/62* (2013.01); *B60G 2204/82* (2013.01); *B60G 2400/051* (2013.01); *B60G 2400/0516* (2013.01); *B60G 2500/20* (2013.01); *B60G 2600/21* (2013.01); *B60G 2800/012* (2013.01); *B60G 2800/214* (2013.01); *B60G 2800/244* (2013.01); *B60G 2800/246* (2013.01)

(58) Field of Classification Search
CPC ........... F02M 63/0031; B60G 21/0555; B60G 2202/442; B60G 2500/20; B60G 2600/21; B60G 2204/82; B60G 2800/012; B60G 2800/214; B60G 2400/0516; B60G 2202/42; B60G 2400/051; B60G 2204/62; B60G 2800/244; B60G 2800/246; F16K 1/36; F16K 1/48
USPC ....................................... 251/368; 123/188.3
See application file for complete search history.

(56) References Cited

U.S. PATENT DOCUMENTS 2,627,259 A     2/1953  Wood et al.
3,040,417 A  *  6/1962  Newton ................... 29/888.452
(Continued)

FOREIGN PATENT DOCUMENTS

DE       69403843 T2    1/1998
DE       19746235 A1    5/1998
(Continued)

OTHER PUBLICATIONS

Machine translation of DE 10 2010 051 871, Accessed Feb. 17, 2015.*

(Continued)

*Primary Examiner* — John K Fristoe, Jr.
*Assistant Examiner* — Andrew J Rost
(74) *Attorney, Agent, or Firm* — Fishman Stewart PLLC

(57) ABSTRACT

A metallic hollow valve may include a tubular shaft having a cavity. The shaft may be coupled to a valve head. The shaft may have an external diameter of 5.0 mm<$d_a$<6.0 mm and an internal diameter of 3.0 mm<$d_i$<4.6 mm. The hollow valve may include a cavity disposed in the valve head. A wall surrounding the cavity in the valve head may include a thickness of 1.0 mm<$b_{1,2}$<2.0 mm.

17 Claims, 1 Drawing Sheet

(56) References Cited

U.S. PATENT DOCUMENTS

| | | | |
|---|---|---|---|
| 3,378,904 A | | 4/1968 | Prasse et al. |
| 4,597,367 A | * | 7/1986 | Hayashi .................... 123/188.3 |
| 5,054,195 A | * | 10/1991 | Keck et al. .............. 29/888.453 |
| 5,619,796 A | | 4/1997 | Larson et al. |
| 6,263,849 B1 | * | 7/2001 | Bonesteel et al. ......... 123/90.51 |
| 6,378,543 B1 | * | 4/2002 | Murayama ................. 137/15.18 |
| 7,127,813 B2 | * | 10/2006 | Bing et al. .............. 29/888.043 |
| 2008/0006793 A1 | | 1/2008 | Hirnschal |
| 2008/0149062 A1 | | 6/2008 | Luepfert |
| 2009/0020082 A1 | | 1/2009 | Suzuki et al. |
| 2011/0174259 A1 | | 7/2011 | Yoshimura |
| 2011/0186000 A1 | * | 8/2011 | Endo ......................... 123/188.2 |

FOREIGN PATENT DOCUMENTS

| | | |
|---|---|---|
| DE | 19804053 A1 | 8/1999 |
| DE | 102005005041 A1 | 8/2006 |
| DE | 102005013088 A1 | 9/2006 |
| DE | 102010051871 A1 | 5/2012 |
| DE | 102011077198 A1 | 12/2012 |
| DE | 102012209187 A1 | 12/2012 |
| EP | 0619419 A1 | 10/1994 |
| EP | 0911493 A2 | 4/1999 |
| EP | 2357326 A1 | 8/2011 |
| EP | 2541000 A1 | 1/2013 |

OTHER PUBLICATIONS

English abstract for DE-102012209187.
English abstract for DE-102010051871.
English abstract for DE-19746235.
European Search Report for EP14152509 dated Oct. 17, 2014.
English Abstract for DE19804053-A1.

* cited by examiner

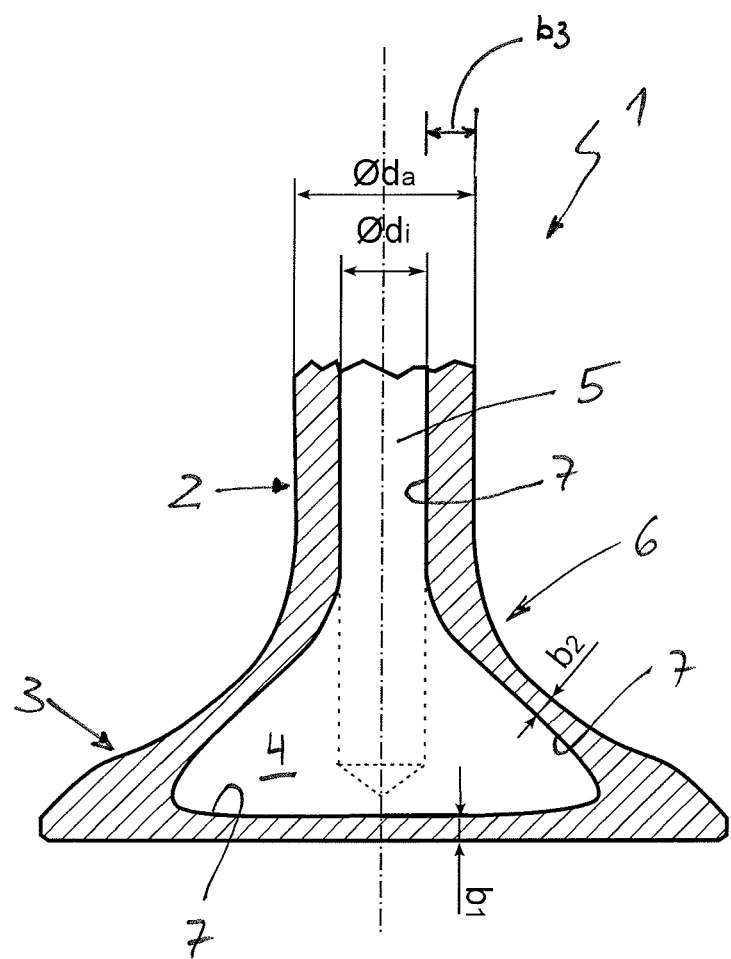

METALLIC HOLLOW VALVE

CROSS REFERENCE TO RELATED APPLICATIONS

This application claims priority to German Patent Application No. 10 2013 203 443.1, filed Feb. 28, 2013, the contents of which are hereby incorporated by reference in their entirety.

TECHNICAL FIELD

The present invention relates to a metallic hollow valve of an internal combustion engine with a tubular shaft and with a valve plate linked thereto in accordance with the introductory clause of the independent claims.

BACKGROUND

The increasing thermal stresses in internal combustion engines, in particular in engines of passenger cars, increasingly require components thereof, such as for example the gas exchange valves, also abbreviated as valves, to also be cooled. For this, so-called hollow valves having an internal cooling medium are used.

From EP 2 541 000 A1 a method is known for the production of metallic hollow valves, in which by means of a corresponding die the valve is successively deformed, in particular its shaft is tapered.

From DE 10 2010 051 871 A1 a method is known for the production of metallic hollow valves for the gas exchange of an internal combustion engine, wherein the cavities of the hollow parts forming the valve are connected with one another and wherein these cavities are produced at least partly by electrochemical metal removal. For this, firstly the valve shaft is drilled through lengthwise, wherein subsequently the cavity is produced in the valve head as an enlargement bore transversely to the longitudinal axis of the valve shaft. By means of the described method, in particular the production of hollow valves is intended to be able to be simplified and, at the same time, their quality to be improved.

From DE 10 2012 209 187 A1 again a method is known for the production of a metallic hollow valve of an internal combustion engine, in which a bore is introduced into a forging blank of pear-shaped construction. A later valve head is then at least partially hollowed out by electrochemical removal, wherein subsequently the cavity which is produced in such a manner is filled by means of a support fluid and the hollow valve is closed. Hereby, the hollow valve can be produced at a comparatively favourable cost.

From DE 10 2011 077 198 A1 again a method is known for the production of a metallic hollow valve of an internal combustion engine with a valve head passing over into a valve shaft, in which a bore is introduced into the valve head and this is subsequently at least partly hollowed out by electrochemical removal. Hereby also, in principle the production of such metallic hollow valves is intended to be improved.

It is generally applicable to metallic hollow valves that these are lighter than solid valves and on filling with a cooling medium, such as sodium for example, they offer an improved heat dissipation. In Otto engines, a hollow valve which offers a particularly good heat dissipation leads to a shifting of the knocking limit and thereby to a particularly advantageous operation. The knocking designates the uncontrolled igniting of the petrol-air mixture owing to too high temperature and pressure. This leads to impacts in the internal combustion engine with high mechanical and thermal stresses, which ultimately impair the lifespan and the efficiency in a negative manner. If, however, the knocking limit can be raised, a higher compacting in the cylinder becomes possible, which leads to a distinct increase in efficiency in the combustion process and thereby to a higher performance with lower fuel consumption.

SUMMARY

The present invention is therefore concerned with the problem of indicating an improved embodiment for a metallic hollow valve of the generic type, which makes a raised knocking limit possible.

This problem is solved according to the invention by the subject matter of the independent claims. Advantageous embodiments are the subject matter of the dependent claims.

The present invention is based on the general idea of raising the knocking limit in an internal combustion engine, by the valves (gas exchange valves) which are used in this internal combustion engine being constructed as very thin-walled hollow valves and thereby being able to be cooled particularly effectively. For this, the metallic hollow valve according to the invention has in a known manner a tubular shaft and a valve head linked thereto. According to the invention, the shaft has an external diameter of between 5.0 and 6.0 mm and an internal diameter of between 3.0 and 4.6 mm, whereby a wall thickness of the shaft can be distinctly reduced compared with conventional hollow valves. In addition, a cavity is provided in the valve head, wherein the walls surrounding this have a thickness of between 1.0 and a maximum of 2.0 mm and thereby likewise enabling a high thermal transmission and an excellent cooling of the hollow valve. Through the comparatively delicate construction of the hollow valve according to the invention, in particular an effective cooling can be achieved on the flat valve head underside facing the combustion chamber, which contributes to shifting the knocking limit, i.e. raising it, and thereby reducing the mechanical and thermal stresses of the internal combustion engine brought about by the knocking. In the delicate valve according to the invention, furthermore a higher compacting can be achieved in the cylinder, which leads to a distinct increase in efficiency in the combustion process and thereby to a higher performance with, at the same time, a lower fuel consumption.

Expediently, a surface roughness $R_z$ of an inner wall of the cavity is $>10$ μm, in particular $R_z>16$ μm. Through the comparatively great surface roughness on the inner wall of the cavity in the valve head, an enlarged heat transmission area is available, which has a positive influence on a heat exchange and thereby also the cooling of the hollow valves according to the invention. In the same manner, of course also the surface roughness of an inner wall can be configured in the shaft of the hollow valve.

In a further advantageous embodiment of the solution according to the invention, the hollow valve is produced from X45CrSi9-3, from X50CrMnNiNbN21-9, from NiCr20TiAl, or from NCF 3015 (Ni 30%, Cr 15%) steel. Such high-alloyed steels permit firstly the delicate construction of the hollow valve according to the invention and, furthermore, have a comparatively high wear resistance. Such high-alloyed steels, furthermore, usually have a high corrosion resistance and in particular also a high resistance to aggressive chemicals, such as for example oils or combustion exhaust gases, so that they are particularly suited for use in such metallic hollow valves in internal combustion engines.

Expediently, the cavity in the valve head is produced by electrochemical removal, wherein the cavity is constructed to be substantially round, ellipsoid or cone-shaped. The electrochemical removal offers the possibility here of creating as large a cavity as possible in the valve head without great mechanical effort and without the use of complicated tools. The electrochemical removal represents here a process which is able to be controlled extremely precisely, so that the metallic hollow valves according to the invention can be produced with a consistently high quality. The shaft can likewise be widened here by electrochemical removal, wherein it is usually firstly drilled.

Further important features and advantages of the invention will emerge from the subclaims, from the drawings and from the associated FIGURE description with the aid of the drawings.

It shall be understood that the features mentioned above and to be further explained below are able to be used not only in the respectively indicated combination, but also in other combinations or in isolation, without departing from the scope of the present invention.

A preferred example embodiment of the invention is illustrated in the drawings and is explained in further detail in the following description.

BRIEF DESCRIPTION OF THE DRAWINGS

The single FIG. 1 shows a cross-section through a metallic hollow valve according to the invention.

DETAILED DESCRIPTION

According to FIG. 1, a metallic hollow valve 1, according to the invention, of an internal combustion engine which is otherwise not shown, has a tubular shaft 2 and a valve head 3 linked thereto. The shaft 2 and the valve head 3 are usually constructed in one piece here. In order to now be able to achieve as efficient a cooling as possible of the metallic hollow valve 1, the latter is equipped in a delicate manner, i.e. with comparatively thin wall thicknesses $b_1$, $b_2$ and $b_3$, wherein the wall thickness $b_1$ is measured in the region of a valve head base facing a combustion chamber which is not shown, whereas the wall thickness $b_2$ is measured in the region of a valve throat 6. The wall thickness $b_3$ refers to the thickness of the wall in the region of the shaft 2. Through the thin wall thicknesses $b_1$, $b_2$ and $b_3$, however, not only is an improved cooling of the metallic hollow valve 1 achieved, but also a raising of the knocking limit of the internal combustion engine, whereby an uncontrolled igniting of a petrol-air mixture with the high mechanical and thermal stresses connected therewith can be avoided, at least, however, can be greatly reduced. The thin wall thicknesses produce here the raising of the knocking limit. In order to achieve this, the metallic hollow valve 1 according to the invention has in the region of its shaft 2 an external diameter $d_a$ which lies between 5 and 6 mm. An internal diameter $d_i$ in the region of the shaft 2 lies between 3.0 and 4.6 mm, so that the wall thickness $b_3$ lies between approximately 0.7 and 1.5 mm. Of course, the wall thickness $b_3$ can also lie between approximately 0.5 and 1.5 mm conditional upon tolerance, wherein preferably the internal diameter $d_i$ lies at 4.6 mm, in so far as the external diameter $d_a$ lies at 6 mm. In the valve head 3 a cavity 4 is provided here, which together with a cavity 5 arranged in the shaft 2 forms a receiving space for a coolant, for example sodium. A wall surrounding the cavity 4 has here in the region of the valve head base a thickness $b_1$ of between 1 and 2 mm, just as in the region of a valve throat 6, so that also in this region the thickness $b_2$ of the wall is approximately 1 to 2 mm.

In order to be able to further improve the thermal transmission between the coolant, arranged in the cavity 4 and 5, and the metallic hollow valve 1, provision can be made that a surface roughness $R_z$ of an inner wall 7 of the cavity 4 or respectively of the cavity 5 is greater than 10 μm, in particular greater than 16 μm. Through the increased surface roughness $R_z$ the area which is available for the heat exchange is increased and thereby the thermal transmission is improved.

Generally, the hollow valve 1 can be produced from a high-alloyed steel, such as for example X45CrSi9-3, from X50CrMnNiNbN21-9, from NiCr20TiAl or from NCF3015 steel. Such high-alloyed steels enable the delicate construction of the metallic hollow valve 1 according to the invention and are, furthermore, resistant to aggressive chemical media, such as for example oils or combustion exhaust gases. In addition, they have a high resistance to wear and corrosion and thereby have a high lifespan.

The cavity 5 in the shaft 2 is usually drilled, whereas the cavity 4 in the valve head 3 is produced by means of electrochemical removal. The cavity 4 can be constructed for example so as to be round, cone-shaped or else ellipsoid. Such an electrochemical removal enables a production of the cavity 4 and thereby also walls surrounding the latter which is, on the one hand, simple and on the other hand is extremely precise.

With the metallic hollow valve 1 according to the invention, the latter can be cooled distinctly better and thereby indirectly the knocking limit of the internal combustion engine can be raised, which increases not only the lifespan of the internal combustion engine, but also leads to a higher performance with, at the same time, a lower fuel consumption. Through the delicate embodiment, in addition, weight is saved, which has a positive effect on a fuel consumption of the internal combustion engine.

The invention claimed is:

1. A metallic hollow valve, comprising: a tubular shaft having a cavity, the shaft coupled to a valve head,
   wherein the shaft has an external diameter of 5.0 mm<$d_a$<6.0 mm and an internal diameter of 3.0 mm<$d_i$<4.6 mm,
   a cavity disposed in the valve head,
   a wall surrounding the cavity in the valve head including a thickness of 1.0 mm<$b_{1,2}$<2.0 mm, and
   wherein a surface roughness $R_z$ of an inner wall of at least one of the cavity in the valve head and the cavity in the shaft is greater than 10 μm.

2. The hollow valve according to claim 1, further comprising a wall surrounding the cavity in the shaft including a thickness of 0.7 mm<$b_3$<1.5 mm.

3. The hollow valve according to claim 2, wherein the shaft and valve head include at least one of X45CrSi9-3, X50CrMnNiNbN21-9, NiCr20TiAl and NCF 3015 steel.

4. The hollow valve according to claim 2, wherein the cavity in the shaft is drilled in the shaft.

5. The hollow valve according to claim 4, wherein the surface roughness $R_z$ of the at least one of the cavity in the valve head and the cavity in the shaft is greater than 16 μm.

6. The hollow valve according to claim 2, wherein at least one of the shaft and valve head includes at least one of X45CrSi9-3, X50CrMnNiNbN21-9, NiCr20TiAl and NCF 3015 steel.

7. The hollow valve according to claim 6, wherein the cavity in the valve head is configured as at least one of round, ellipsoid, and cone-shaped.

8. The hollow valve according to claim 6, wherein the surface roughness $R_z$ is greater than 16 μm.

9. The hollow valve according to claim 1, wherein the shaft and valve head include at least one of X45CrSi9-3, X50CrMnNiNbN21-9, NiCr20TiAl and NCF 3015 steel.

10. The hollow valve according to claim 1, wherein the cavity in the valve head is produced by electrochemical removal at least in a region of the surrounding inner wall.

11. The hollow valve according to claim 10, wherein the cavity in the valve head is configured as at least one of round, ellipsoid, and cone-shaped.

12. The hollow valve according to claim 10, wherein the surface roughness $R_Z$ of the inner wall of the cavity in the valve head is greater than 16 μm.

13. The hollow valve according to claim 1, wherein the cavity in the valve head is configured as at least one of round, ellipsoid and cone-shaped.

14. The hollow valve according to claim 1, wherein the cavity in the shaft is drilled in the shaft.

15. The hollow valve according to claim 1, wherein the surface roughness $R_Z$ of the inner wall of at least one of the cavity in the valve head and the cavity in the shaft is greater than 16 μm.

16. The hollow valve according to claim 1, wherein the surface roughness $R_Z$ of the inner wall of the cavity in the valve head greater than 16 μm.

17. The hollow valve according to claim 1, wherein the surface roughness $R_Z$ of the inner wall of the cavity in the shaft is greater than 16 μm.

* * * * *